United States Patent [19]

Abbott et al.

[11] Patent Number: 4,674,514
[45] Date of Patent: Jun. 23, 1987

[54] ULTRASONIC COMPOUND SCAN WITH AN OSCILLATING TRANSDUCER

[75] Inventors: John G. Abbott, Kaiseraugst; Christoph B. Burckhardt, Muttenz; Pierre-André Grandchamp, Münchenstein; Peter Krummenacher, Gipf-Oberfrick; Claude Schlaepfer, Wallbach, all of Switzerland

[73] Assignee: Kontron Holding AG, Zurich, Switzerland

[21] Appl. No.: 779,189

[22] Filed: Sep. 23, 1985

[30] Foreign Application Priority Data

Sep. 25, 1984 [CH] Switzerland .................. 4574/84

[51] Int. Cl.⁴ .............................................. A61B 10/00
[52] U.S. Cl. ....................................... 128/660; 73/676
[58] Field of Search ................................ 128/660, 661; 73/619-621, 625-626

[56] References Cited

U.S. PATENT DOCUMENTS

| | | |
|---|---|---|
| 3,990,300 | 11/1976 | Kossdff . |
| 4,241,608 | 12/1980 | Dees et al. . |
| 4,272,991 | 6/1981 | Cribbs .................... 128/660 X |
| 4,277,979 | 7/1981 | Vilkomerson et al. . |
| 4,281,549 | 8/1981 | Kretz ......................... 73/626 |
| 4,368,643 | 1/1983 | Tachita et al. ........... 128/660 X |
| 4,387,447 | 5/1983 | Kretz ........................ 128/660 X |
| 4,391,281 | 7/1983 | Green ......................... 128/660 |
| 4,398,422 | 8/1983 | Haerten . |
| 4,399,704 | 8/1983 | Gardineer et al. . |
| 4,409,982 | 10/1983 | Plesset et al. ............. 128/660 |
| 4,431,007 | 2/1984 | Amazeen .................. 128/660 |

FOREIGN PATENT DOCUMENTS

| | | |
|---|---|---|
| 037012 | 7/1981 | European Pat. Off. . |
| 2719130 | 1/1978 | Fed. Rep. of Germany . |

*Primary Examiner*—Kyle L. Howell
*Assistant Examiner*—Francis J. Jaworski
*Attorney, Agent, or Firm*—Jon S. Saxe; Bernard S. Leon; George W. Johnston

[57] ABSTRACT

A real-time method and apparatus is disclosed for scanning large body areas to produce an ultrasound cross-sectional picture of the area in which at least two different and partially overlapping sector scans of the body are carried out in one scanning plane by the pulse-echo method utilizing an ultrasound transducer unit having a rigid transducer which is pivotable about an axis of oscillation perpendicular to the scanning plane, which performs an oscillatory movement about the axis of oscillation and between two end positions on each scan, and which is segmented into adjacent transducer elements. In performing the scans, at least two different transducer sets are used, each containing one or more transducer elements, each transducer set being used both for the emission of the ultrasound pulses and for the reception of echo waves. In all the scans the position of the axis of oscillation remains unchanged with respect to the body.

18 Claims, 7 Drawing Figures

ULTRASONIC COMPOUND SCAN WITH AN OSCILLATING TRANSDUCER

DESCRIPTION

This invention relates to a method and apparatus for producing an ultrasound cross-sectional image of a body, in which at least two different and partially overlapping sector scans of the body are carried out by the pulse-echo method in one scanning plane utilizing an ultrasound transducer unit incorporating a single transducer.

PRIOR ART

In abdominal and pre-natal gynecological ultrasound diagnosis and in the examination of soft parts of the body it is customary to use the two-dimensional B-image method. In this method an area under examination is scanned line-wise with the ultrasound beam. There are various techniques for displacing the ultrasound beam as required to build up the ultrasound picture. In addition, a distinction is made between the compound scanning method, also known as the slow B-image method, and the real-time method, also known as the fast B-image method.

In the classical compound scanning method an ultrasound transducer comprising a single monolithic transducer is passed over the skin with the interposition of a coupling medium, whereby a combination of parallel and angular displacements of the transducer is carried out. The position of the transducer at any time is transmitted to an electrical deflection circuit to deflect the electron beam of the display unit in the direction of the associated ultrasound beam. In this way the ultrasound picture is built up line-by-line. In this method image storage must be used for the display because the image build-up is relatively slow and takes, for example, half a minute to some two minutes per image. On the other hand, the method has a number of advantages:

1. The granularity ("speckle noise") of the image is reduced. As a result, grey tone differences between different tissue parts are more readily visible and structures of different tissues such as, for example, tumors and cysts, are more easily recognized.
2. The depiction of tissue and organ boundaries is improved. Since such boundaries reflect the ultrasound waves, the transducer delivers a maximal echo signal when the ultrasound beam is vertically incident to the boundary surface. There is a high probability that this condition is satisfied in compound scanning because the body under investigation is subjected to ultrasound pulses from a number of different directions.

The disadvantages of the classical compound scanning method are as follows:

1. It is not possible to obtain a real-time display of movements because with the slow image build-up only a static storage image can be produced, and this has to be erased for a new image build-up.
2. The time taken for the examination is relatively long.
3. Artifacts caused by organ movements during the slow picture build-up can have an adverse effect on picture quality.
4. The equipment required and the operating techniques are relatively complex.
5. Particularly when the transducer is moved manually, the picture quality depends very much on the operator's skill. In order to obtain usable pictures, therefore, the operator must undergo suitable training. Pictures taken of the same object by different operators usually differ, even if they have equivalent training and experience.

In contrast to the classical compound scanning method, the real time method is characterized by a rapid picture build-up. Each picture can be produced in fractions of a second by mechanical or electronically controlled scanning. In the real time method the image repetition frequencies obtained can exceed 15 pictures per second.

The main advantage of the real time method is the relatively short examination time with comparable good resolution and sufficient grey graduation. Also, the relatively high image repetition frequency enables movements to be shown in real time, i.e. movements can be observed directly during the examination. Other advantages of the real time method include the achievement of picture reproducibility (i.e. picture quality is less dependent on the manual skill of different operators), lower equipment costs, and simpler equipment operation.

One important disadvantage of the real time method in comparison with the compound scanning method is that the display of different soft parts is less satisfactory. For one, the grey tone differences are less clearly visible due to greater image speckle noise. Also, the depiction of tissue and organ boundaries is not as good because the real time method does not offer the possibility of subjecting the object under examination to ultrasound wave pulses from different directions.

There is accordingly a need for a method and apparatus by means of which the advantages of the above two scanning methods can be achieved without the need to accept the disadvantages of those methods. This need is particularly felt in medical ultrasound diagnosis.

The aim of the invention, therefore, is to provide a method and apparatus by means of which it is possible to achieve the advantages of both the compound scanning method and of the real time method while substantially obviating the disadvantages of these two methods.

SUMMARY OF THE INVENTION

According to the invention, this aim is achieved by an ultrasound imaging method which includes the steps of:

(a) oscillating a rigid, multi-element and pivotable transducer unit between two end positions about an axis of oscillation perpendicular to the scanning plane, said unit having a plurality of sets of transducer elements, each set consisting of one transducer element or a plurality of adjoining transducer elements, (b) actuating during the scans at least two different transducer sets for both the emission of ultrasound pulses and for the reception of echo waves, and (c) during the scans, maintaining unchanged the position of the axis of oscillation with respect to the body.

The invention also relates to an ultrasound scanner for use with a transceiver in an ultrasonic imaging apparatus for producing cross-sectional pictures of a body, comprising:

(a) an ultrasound transducer unit comprising:
  (i) a single transducer pivotable about an axis of oscillation perpendicular to the scanning plane,
  (ii) said transducer forming a rigid unit and being segmented into adjacent transducer sets, each set comprising one transducer element or a plurality of adjoining transducer elements;

(iii) at least two different transducer sets of transducer being adapted to be electrically connected optionally to a transceiver unit of said ultrasonic apparatus, (b) a drive mechanism by means of which an oscillatory movement of the transducer can be effected about the axis of oscillation and between two end positions.

The invention also relates to an ultrasound imaging apparatus which includes the above-described ultrasonic transducer unit, a drive mechanism by means of which an oscillatory movement of the transducer can be effected about the axis of oscillation between two end positions, and wherein at least two different transducer sets are adapted to be optionally connected to a transceiver unit.

Reference should also be made to a related system employing common components and techniques which is disclosed in concurrently filed and commonly owned application Ser. No. 779,187 filed Sept. 23, 1985 entitled "Ultrasonic Compound Scan With Rotating Transducer".

With the method and apparatus according to the invention it is possible to produce an ultrasound cross-sectional picture of a body which combines the above noted advantages of the conventional compound scanning method (the slow B-image method) with those of the real-time method (fast B-image method) while avoiding the disadvantages of both. The advantages achieved by the invention are as follows:

The ultrasound images produced have a low granularity ("speckle noise") so that grey tone differences between similar tissues can be recognized more easily.

Tissue and organ boundaries are clearly recognizable in the resulting pictures.

Since the method according to the invention can be performed with a transducer which can be disposed very close to the body and which as a result of its low mass can perform relatively fast oscillatory movements, it is possible to obtain a relatively high image repetition frequency and thus show movements in real time.

Due to the relatively high image repetition frequency obtained, organ movements during the scan do not have an adverse effect on picture quality.

The range of applications of the invention is very wide. Using a transducer adapted for the specific application it is possible, for example, to examine different parts of a patient's body. The invention is particularly advantageous when applied to real-time ultrasound diagnosis of the abdominal organs. Due to the image repetition frequency values achieved with the invention, it is also suitable for cardiac examination.

The pictures obtained are distinguished by very good reproducibility, i.e. the picture quality obtained is substantially independent of the manual skill of the operator.

The width of the scanned area at and near the surface of the skin is larger than in the case of a sector scan.

It is a relatively simple matter to perform the method according to the invention and the examination time required for this purpose is very short.

The method according to the invention can be carried out with relatively little outlay in terms of apparatus.

Further advantages and features of the invention will be apparent from the following description of exemplified embodiments illustrated in the accompanying drawings wherein:

DETAILED DESCRIPTION OF THE PREFERRED EMBODIMENTS

Figure 1:
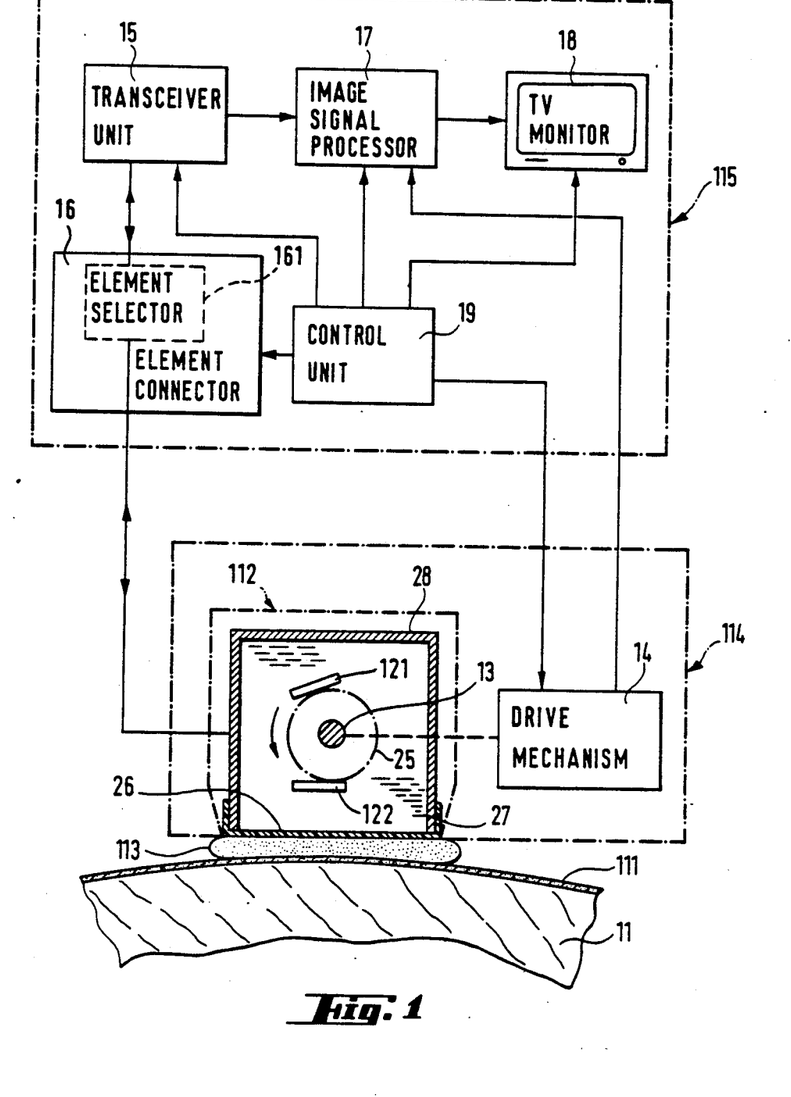
FIG. 1 is a block diagram of the system according to the invention.

FIG. 1 diagrammatically illustrates an ultrasound imaging system for performing the method according to the invention.

The system includes an ultrasound scanner 114 and a signal processing unit 115. Ultrasound scanner 114 comprises in turn an ultrasound transducer unit 112 and a drive mechanism 14.

The signal processing unit 115 shown in FIG. 1 comprises a transceiver unit 15, an element selector 16, an image signal processing unit 17, a television monitor 18 for the ultrasound picture display, and a control unit 19.

Figure 2:
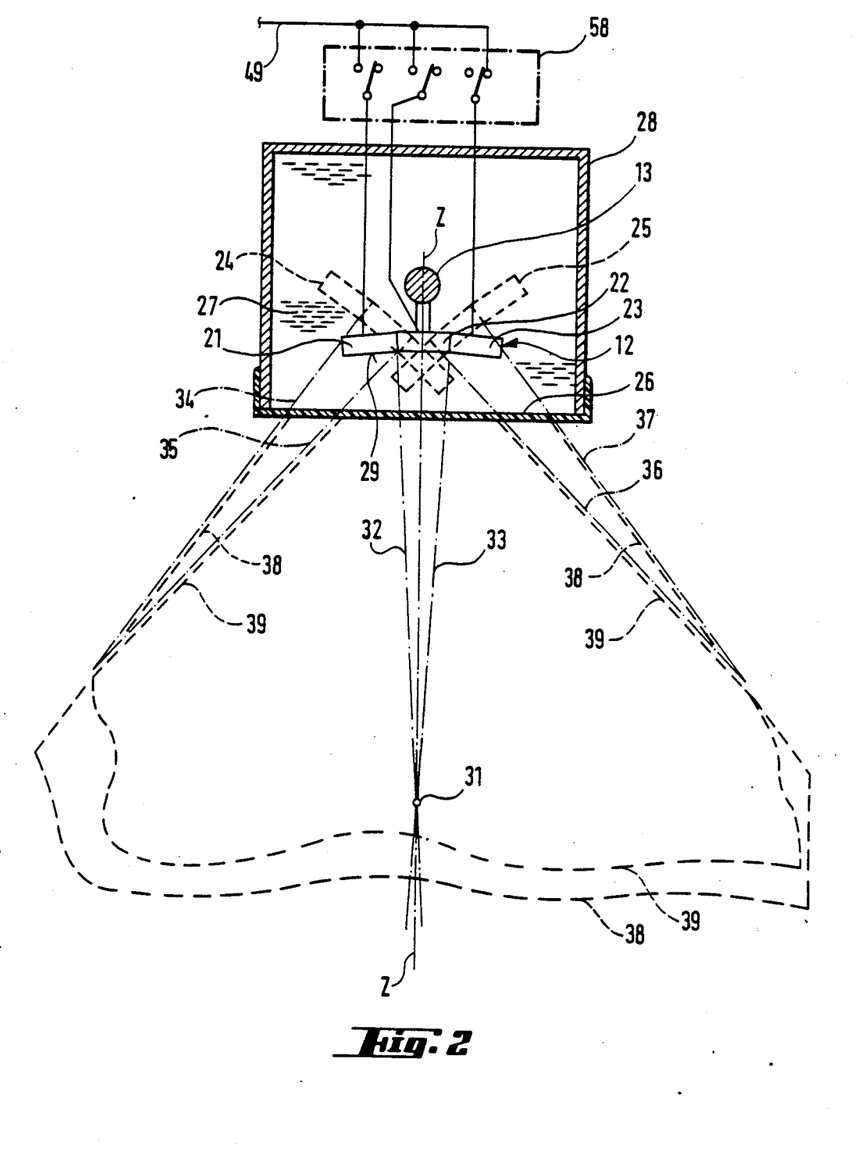
FIG. 2 is a schematic diagram of one embodiment of the ultrasound transducer unit 112 shown in FIG. 1, FIGS. 3 to 5 are schematic diagrams of three embodiments respectively of the transducer 12 in FIGS. 1 and 2, FIGS. 6 and 7 are perspective views showing the use of the apparatus according to the invention and the associated ultrasound scanner in examining a patient.

As shown in FIGS. 1 and 2, transducer unit 112 comprises a single ultrasound transducer 12 which is pivotable about an axis of oscillation 13 perpendicular to the scanning plane, and which is enclosed in a container formed by a housing 28 and a diaphragm 26 permeable to ultrasound, e.g. consisting of plastics. The container is filled with a transmission liquid 27, e.g. castor oil.

In a preferred embodiment the transducer 12 comprises a monolithic ultrasound transducer and adjacent energizing electrodes. By the use of these electrodes the transducer 12 can be operated as an array of adjacent transducer elements which can be operated individually or in groups.

The transducer 12 forms a rigid unit and its emission surface is preferably spherical but may alternatively be cylindrical or flat. The area covered by the transducer electrodes is made up of surface segments which may have different shapes, examples of which are explained below with reference to FIGS. 3–5.

An oscillatory movement of the transducer 12 is produced by the drive mechanism 14 under control of the control unit 19. The drive mechanism comprises a drive motor, a selsyn which is connected as an instantaneous position sensor, and a set-value source. These are incorporated in a control circuit for the drive motor in order to obtain the required angular movement of the transducer 12. The selsyn delivers a signal corresponding to the position of the transducer 12 at any time, and this signal is fed to the image signal processing unit 17. For some applications, the drive mechanism may be simplified, e.g. by omitting its control circuit and employing an ordinary selsyn. Alternatively, a stepping motor may be used for the drive.

The transceiver unit 15 generates the transmission signals for the transducer elements in transducer 12, and processes the echo signals delivered by the transducer elements in order to produce picture signals.

The element selector 16 is connected between the transceiver unit 15 and the transducer 12 and serves to select at least two different groups of adjacent transducer elements in the transducer and to electrically connect each selected group to the transceiver unit.

Preferably, the different groups are of equal widths and the element selector 16 selects the groups of elements such that the distance between the centers of the emission surfaces of the different transducer groups is substantially equal to half the width of each group.

Individual pictures are recorded by scanning the body 11, FIG. 1, with the different transducer elements or groups comprising the transducer 12. The purpose of the picture signal processing unit 17 is to carry out electronic compounding, i.e. to assemble these individual pictures to give a compound picture. For this purpose, the unit 17 comprises means for storing and associating the image signals delivered by the transceiver unit and means for transmitting the resulting image signals corresponding to the compound image to the television monitor 18.

For further details of the construction and operation of the unit 17 and other system components, reference should be made to the concurrently filed and commonly owned patent application Ser. No. 779,186 entitled "Real-time Display of an Ultrasonic Compound Image".

The television monitor 18 displays a picture produced by the above-mentioned compounding of individual pictures.

The control unit 19 controls the function of the drive mechanism 14, the transceiver unit 15, the element selector 16, the image signal processing unit 17, and the television monitor 18.

Shown in FIG. 2 is a cross-section in the scanning plane of one embodiment of the transducer system 112 and a section 58 of the element selector 16 illustrated in FIG. 1. The transducer 12 is segmented into three transducer elements 21, 22, 23 and is pivotable about the axis of oscillation 13 between two end positions 24 and 25. The transducer elements 21, 22 and 22, 23 can be connected alternately, individually or in groups to the transceiver unit 15 of FIG. 1 via a line 49 by way of the switch unit 58 contained in the element selector 16.

For focusing the ultrasound waves, the emission surface 29 of transducer 12 preferably has a spherical or cylindrical curvature. When the transducer is in the middle position shown in solid lines in FIG. 2, the center of curvature of the emission surface 29 is situated at point 31, and the major axes 32 and 33 of the ultrasound beams transmitted by the transducer elements 21, 22 and 22, 23 pass through the point 31 laying on the axis of symmetry Z—Z of the transducer in the scanning plane.

When transducer 12 is in the end positions 24 and 25, these major axes are situated in the positions defined by the lines 34 and 35 (for end position 24) and 36 and 37 (for end position 25).

The area enclosed by line 38 in FIG. 2 defines the total area scanned by the major axis 32 or the major axis 33. The area enclosed by line 39 on the other hand, defines the area scanned both by the major axis 32 of the group of transducer elements 21, 22 and by the major axis 33 of the group 22, 23. Thus, compounding or assembly of the second order can be carried out by superimposing the two individual pictures produced by scanning with these groups of transducer elements.

The transducer 12 shown in FIGS. 1 and 2 comprises three transducer elements. As will be explained below with reference to FIGS. 3–5, however, the transducer may contain more than three transducer elements and the emission surface of each of these elements may have different shapes in dependence on the shape of the electrodes used to energize these elements.

Figure 3:
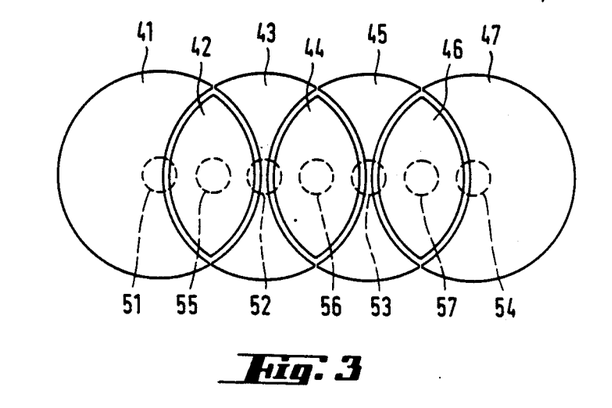

In the embodiment shown in FIG. 3, the area covered by the transducer electrodes is made up of circular surface segments which segment the transducer into elements 41–47. Similarly, in the embodiments shown in FIGS. 4 and 5 the transducer is segmented into elements 61–65 and 81–85.

Figure 4:
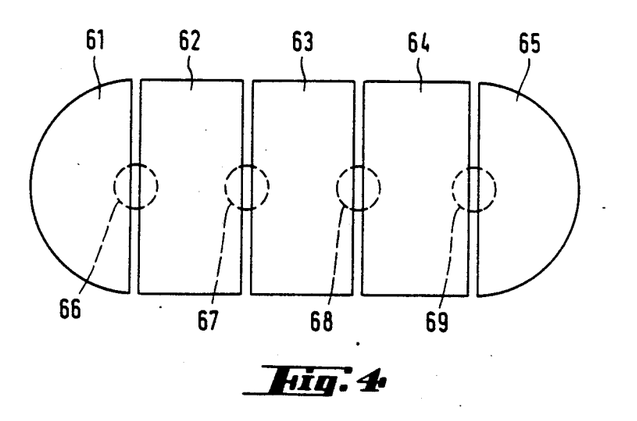
Figure 5:
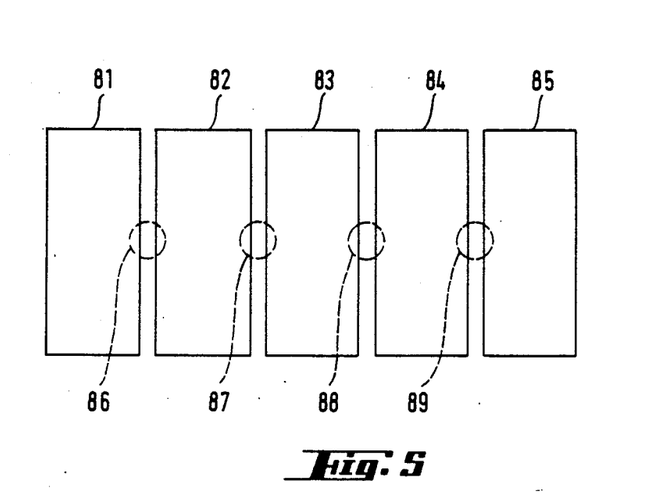

In order to focus the ultrasound beam produced with the transducer shown in FIGS. 3, 4 or 5, or the corresponding reception characteristic, it is possible to provide different delays in the transmission signals or in the echo signals from the individual transducer elements, instead of or in addition to utilizing curvature of the transducer emission surface.

Different ultrasound beams can be produced by using different groups of transducer elements.

Each of the small circles 51–57 in FIG. 3 represents a center of symmetry of the cross-section of an ultrasound beam produced by a particular grouping of the transducer elements. The relationships are shown in the following table for the transducer shown in FIG. 3:

TABLE 1

| Group | Transducer elements | Center of symmetry |
| --- | --- | --- |
| 1 | 41, 42 | 51 |
| 2 | 42, 43, 44 | 52 |
| 3 | 44, 45, 46 | 53 |
| 4 | 46, 47 | 54 |
| 5 | 41, 42, 43, 44 | 55 |
| 6 | 42, 43, 44, 45, 46 | 56 |
| 7 | 44, 45, 46, 47 | 57 |
| 8 | 41, 42, 43, 44, 45, 46 | 52 |
| 9 | 42, 43, 44, 45, 46, 47 | 53 |
| 10 | 41, 42, 43, 44, 45, 46, 47 | 56 |

Individual pictures having different amounts of speckle noise can be produced by scanning a body with combinations of groups to 1 to 10. By electronically combining a plurality of these individual pictures it is possible to produce a compound picture in which the organ and tissue boundaries are more clearly visible than in the case of individual pictures.

In the embodiment shown in FIG. 4, the transducer 12 comprises the transducer elements 61–65. Each small circle 66–69 represents approximately the center of symmetry of the cross-section of an ultrasound beam produced with a group of two adjacent transducer elements. Like the transducer shown in FIG. 3, combinations of the transducer elements of FIG. 4 can be used to produce a compound picture for the purpose of a higher order compounding. Various combinations are listed in Table 2.

TABLE 2

| Group | Transducer elements |
| --- | --- |
| 1 | 61, 62, 63 |
| 2 | 62, 63, 64 |
| 3 | 63, 64, 65 |
| 4 | 61, 62, 63, 64 |
| 5 | 62, 63, 64, 65 |
| 6 | 61, 62, 63, 64, 65 |

The above description with respect to the embodiments shown in FIGS. 3 and 4 applies as well to the transducer embodiment shown in FIG. 5 which comprises transducer elements 81–85. In FIG. 5 each of the small circles 86–89 represents a center of symmetry.

When the apparatus described above operates, for example, with a transducer of the kind shown in FIG. 5, the element selector is advantageously controlled to obtain good transverse resolution. For this purpose the group of transducer elements having symmetrically configured emission surfaces are selected such that the axes of symmetry of the emission surfaces of the individual groups come to lie either in the gaps between two adjacent transducer elements or at the center of the emission surface of a transducer element. That is, under control of the element selector, the groups of transducer elements are actuated such that at least once during a complete working cycle the axes of symmetry of the emission surfaces of the selected groups occupy each possible position in the gaps between two adjacent transducer elements or at the center of a transducer element, possible exceptions being only the boundary transducer elements i.e. those of the first half of the first group and of the second half of the last group, of the transducer unit.

When the above-described apparatus operates, for example, with a transducer of the kind shown in FIGS. 3, 4 or 5 the element selector 16 is advantageously so controlled that each of the transducer elements or element groups selected by it, is used only in one specific direction of the oscillatory movement of the transducer. This avoids image interference resulting from the use of the same transducer element or group during opposite directions of the oscillation. This form of control makes it possible to obtain good picture quality over the entire examination depth and over the entire width of the resultant compound picture while avoiding perceptible image interference which results when scans carried out with the same transducer in opposite directions produce images which differ from one another.

In the two illustrations which follow, oscillatory movements are carried out successively, each oscillatory movement starting at one of the end positions 24 or 25 in FIG. 2 and ending at the other end position 25 or 24. In the examples, and with reference to FIG. 3, groupings identified in Table 3 below are employed.

TABLE 3

| Group | Transducer elements |
| --- | --- |
| 1 | 41, 42 |
| 2 | 41, 42, 43 |
| 3 | 44, 45, 46 |
| 4 | 46, 47 |

For a 4th order compounding, i.e. to form a compound picture by superimposing four individual sector scan pictures, the groups of Table 3 can be used and controlled in various ways.

In the first example, the grouping and sequencing is as shown in Table 4.

TABLE 4

| Oscillatory Movement | Direction of movement | Transducer Group used |
| --- | --- | --- |
| 1 | from left to right | 1 |
| 2 | from right to left | 3 |
| 3 | from left to right | 2 |
| 4 | from right to left | 4 |

In a second illustration, the number of oscillatory movements required is reduced by using the transducer grouping listed in Table 5:

TABLE 5

| Oscillatory Movement | Direction of movement | Transducer Group used |
| --- | --- | --- |
| 1 | from left to right | 1,2,1,2 |

TABLE 5-continued

| Oscillatory Movement | Direction of movement | Transducer Group used |
| --- | --- | --- |
| 2 | from right to left | 3,4,3,4 |

In this second example, different transducer groups, e.g. 1 and 2 are used alternately during the same oscillatory movement.

In operation, and as shown in FIG. 1, the transducer system 112 is applied to the skin 111 of the part of the body 11 under examination. To this end a transmission gel 113 is applied between the transducer system diaphragm 26 and the patient's skin. The apparatus is then operated with the transducer 12 performing an oscillatory movement about the axis 13 to scan the body, the transducer moving continuously between two extreme end positions 24 and 25 (see FIG. 2) as it oscillates.

In the performance of the scans, at least two different transducer elements or element groups are selected for use by means of the element selector 16 (e.g. the groups described above with reference to FIGS. 2-5), each transducer element or group being used both for the emission of ultrasound pulses and for the reception of echo waves. This emission and reception take place during the oscillatory movement of the transducer. In all the scans of the body 11 carried out in this way, the position of the axis of oscillation 13 with respect to the body 11 remains unchanged.

With the above described method, therefore, at least two different and partially overlapping sector scans of the body are carried out by the pulse echo process, in one scanning plane and with a single ultrasound transducer system. Thus different individual pictures are recorded by these sector scans. The picture signals corresponding to each of these pictures are obtained from the echo signals by means of the transceiver unit 15 and continuously stored in the image signal processor unit 17. An electronic combination of the different individual pictures produced by the sector scans is continuously carried out in this unit by suitable processing of the stored image signals. The compound picture produced by this combination is displayed by the television monitor 18.

In performing the method, the speckle noise in the resulting ultrasound pictures is reduced by using transducer element groups having equal widths, and the distance between the centers of the emission surfaces of the groups employed during the different scans is equal to approximately half the width of the group of transducer elements.

In order to increase the number of scanning lines in the production of the cross-sectional pictures, the emission surfaces of the groups of transducer elements are constructed in symmetrical configurations such that the axes of symmetry of the emission surfaces of the individual groups come to lie either in the gaps between two adjacent transducer elements or at the center of the emission surface of a transducer element.

In order to obtain a very high number of scanning lines, the groups of transducer elements are so selected that at least once during a complete scanning cycle the axes of symmetry of the emission surfaces of the selected groups occupy each possible position in the gaps between two adjacent transducer elements or at the center of a transducer element—possible exceptions involving only the boundary transducer elements, i.e.

those of the first half of the first group and of the second half of the last group.

Tests have shown that picture distortion visible in certain areas of the ultrasound picture is due to the fact that one and the same transducer element or group of transducer elements is used during both directions of oscillatory movements. In order to obviate such distortion, each of the different transducer elements or each of the different groups of transducer elements is used solely during one specific direction of the oscillatory movement. To this end, for example, during the entire period of the oscillatory movement of the transducer in a first direction at least one first group of transducer elements, e.g. the group formed by the transducer elements 21, 22 in FIG. 2, is used both for the emission of ultrasound pulses and for the reception of echo waves, and during the entire period of the oscillatory movement of the transducer in the opposite direction at least one second group of transducer elements which differs from the first group, e.g. the group formed by the transducer elements 22, 23 in FIG. 2, is used both for the emission of ultrasound pulses and for the reception of echo waves.

As another way of avoiding the above-mentioned distortion at least one first pair of elements or groups of transducer elements, e.g. the groups 1 and 2 described above with reference to FIG. 3, are used alternately both for the emission of ultrasound pulses and for the reception of echo waves during oscillation in one direction; during the oscillatory movement of the transducer in the opposite direction this alternating operation is repeated using at least one second pair of elements or groups of transducer elements differing from one another and from the transducer elements or groups of the first pair, e.g. the groups 3 and 4 described above with reference to FIG. 3. In this way, each of the selected transducer elements or groups of transducer elements is used only during oscillatory movements of the transducer in one specific direction.

Figure 6:
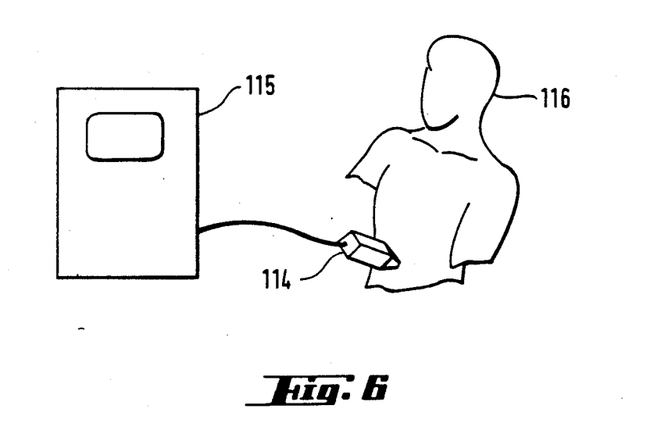
Figure 7:
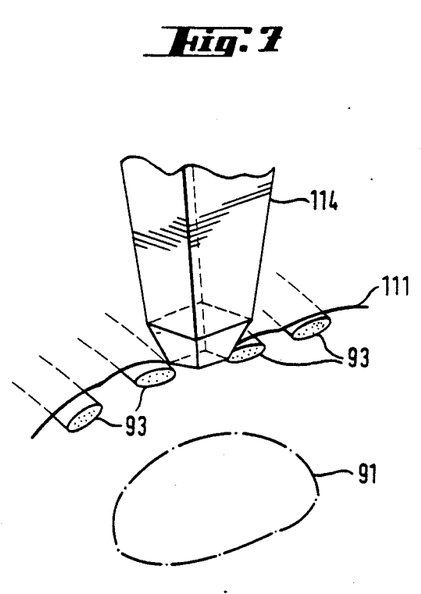

One use of the system according to the invention for the examination of a patient is shown in FIG. 6 where the scanner 114 scans the body 11 of the patient during examination of his abdomen. The other systems components are deployed in the console 115. FIG. 7 shows the arrangement of the scanner 114 with respect to the heart 91 and ribs 93 of the patient during cardiac examination. During these examinations, the transducer 12 contained in the transducer system 114 operates in the manner described above; it oscillates to and fro, emits ultrasound pulses through the patients' skin 111, and receives the resultant echo waves.

We claim:

1. A method of producing an ultrasound cross-sectional image of a body, in which at least two different and partially overlapping sector scans of the body are carried out in one scanning plane by the pulse echo method utilizing a single ultrasound transducer unit, said method comprising the steps of:
    (a) oscillating a pivotable transducer unit between two end positions about an axis of oscillation perpendicular to the scanning plane, said unit including a rigid array of adjacent transducer elements, said axis of oscillation being spaced from said transducer elements,
    (b) actuating during the oscillations at least two different sets of transducer elements to provide said at least two different and partially overlapping sector scans of the body in one scanning plane, each set being used for both the emission of ultrasound pulses and for the reception of echo waves, and
    (c) during the scans, maintaining unchanged the position of the axis of oscillation with respect to the body.

2. A method according to claim 1, in which said sets of transducer elements are of equal widths, each set comprises at least two adjacent transducer elements, and the distance between the centers of the emission surfaces of said actuated sets is approximately equal to half the width of the set.

3. A method according to claim 1, in which the emission surfaces of said sets of transducer elements are constructed in symmetrical configurations and controlled such that the axes of symmetry of said emission surfaces are situated either in the gaps between two adjacent transducer elements or at the center of the emission surface of a transducer element.

4. A method according to claim 3, in which the sets of transducer elements are so selected and controlled that at least once during an entire scan cycle and with respect to at least those transducer elements not at the boundaries of the transducer unit, the axes of symmetry of the emission surfaces of the selected sets occupy each possible position in the gaps between two adjacent transducer elements or at the center of a transducer element.

5. A method according to claim 1, in which during the entire period of the oscillatory movement of the transducer unit in a first direction at least one first set of transducer elements is used both for the emission of ultrasound pulses and for the reception of echo waves, and during the entire period of the oscillatory movement of the transducer in a second opposite direction, at least one second set of transducer elements differing from the first set is used both for the emission of ultrasound pulses and for the reception of echo waves.

6. A method according to claim 1, in which during the oscillatory movement of the transducer unit in a first direction sets of transducer elements different from one another are used alternately both for the emission of ultrasound pulses and for the reception of echo waves, and during the oscillatory movement of the transducer in a second opposite direction sets of transducer elements different from one another and from the sets used in the first direction are used alternately both for the emission of ultrasound pulses and for the reception of echo waves.

7. A method according to claim 1, in which each of said actuated sets of transducer elements is used only in one specific direction of the oscillatory movement of the transducer.

8. An ultrasound imaging apparatus for producing cross-sectional pictures of a body by carrying out at least two different and partially overlapping sector scans of the body in one scanning plane by the pulse echo method, comprising:
    (a) a single ultrasound transducer unit comprising a rigid array of transducer elements, said array being pivotable about an axis of oscillation which is spaced from the transducer elements and which is perpendicular to the scanning plane;
    (b) a drive mechanism by means of which an oscillatory movement of the transducer unit can be effected about the axis of oscillation and between two end positions;
    (c) a transceiver system;

(d) an element selector system connected between the transducer unit and the transceiver unit to select at least two different sets of transducer elements to provide said at least two different and partially overlapping sector scans of the body in one scanning plane and to electrically connect each selected set to the transceiver unit.

9. Apparatus according to claim 8, in which said transducer unit has an emission surface which is spherical, cylindrical or flat.

10. Apparatus according to claim 8, in which said transducer sets include an emission surface formed of segments of circular surfaces.

11. Apparatus according to claim 8, in which said sets of transducer elements are of equal widths, each set comprises at least two adjacent transducer elements, and the element selector system is configured to select said sets such that the distance between the centers of the emission surfaces of the different sets is approximately equal to half the width of each set.

12. Apparatus according to claim 8, in which said element selector system is configured to select the sets of transducer elements such that the axis of symmetry of the emission surfaces of the selected sets come to lie either in the gaps between two adjacent transducer elements or at the center of the emission surface of a transducer element.

13. Apparatus according to claim 12, in which said element selector system is configured to select the sets of transducer elements such that with respect to at least those transducer elements not at the boundary of the transducer unit, at least once during an entire scan cycle the axes of symmetry of the emission surfaces of the selected sets occupy each possible position in the gaps between two adjacent transducer elements or at the center of a transducer element.

14. Apparatus according to claim 8, in which during the entire period of the oscillatory movement of the transducer unit in a first direction the element selector system connects at least one first set of transducer elements to the transceiver unit and during the entire period of the oscillatory movement of the transducer in a second opposite direction the element selector system connects at least one second set of transducer elements differing from the first set, to the transceiver unit.

15. Apparatus according to claim 8, in which during the oscillatory movement of the tranducer unit in a first direction the element selector system alternately connects at least one first pair of sets of transducer elements differing from one another to the transceiver unit and during the oscillatory movement of the transducer in a second opposite direction the element selector system alternately connects at least one second pair of sets of transducer elements differing from one another and from the sets of the first pair, to the transceiver unit.

16. Apparatus according to claim 8, in which the element selector system is configured such that each of the different sets of transducer elements selected by said system can be used solely in one specific direction of the oscillatory movement of the transducer unit.

17. Apparatus according to claim 8, in which said sets of transducer elements include an emission surface made up of rectangular surfaces.

18. Apparatus according to claim 8, in which said sets of transducer elements include an emission surface made up of segments of circular surfaces and of rectangular surfaces.

* * * * *

UNITED STATES PATENT AND TRADEMARK OFFICE
CERTIFICATE OF CORRECTION

PATENT NO. : 4,674,514                                 Page 1 of 3

DATED      : June 23, 1987

INVENTOR(S) : John G. Abbott et al.

It is certified that error appears in the above-identified patent and that said Letters Patent is hereby corrected as shown below:

The title page showing the illustrative figure should be deleted to appear as per attached title page.

In the Drawings, Fig. 1 should appear as shown on the attached sheet.

Signed and Sealed this

Sixteenth Day of May, 1989

*Attest:*

DONALD J. QUIGG

*Attesting Officer*      *Commissioner of Patents and Trademarks*

United States Patent [19]

Abbott et al.

[11] Patent Number: 4,674,514
[45] Date of Patent: Jun. 23, 1987

[54] ULTRASONIC COMPOUND SCAN WITH AN OSCILLATING TRANSDUCER

[75] Inventors: John G. Abbott, Kaiseraugst; Christoph B. Burckhardt, Muttenz; Pierre-André Grandchamp, Münchenstein; Peter Krummenacher, Gipf-Oberfrick; Claude Schlaepfer, Wallbach, all of Switzerland

[73] Assignee: Kontron Holding AG, Zurich, Switzerland

[21] Appl. No.: 779,189

[22] Filed: Sep. 23, 1985

[30] Foreign Application Priority Data

Sep. 25, 1984 [CH] Switzerland ............ 4574/84

[51] Int. Cl.⁴ .................................... A61B 10/00
[52] U.S. Cl. .......................... 128/660; 73/676
[58] Field of Search ............... 128/660, 661; 73/619-621, 625-626

[56] References Cited

U.S. PATENT DOCUMENTS

| 3,990,300 | 11/1976 | Kossoff |  |
|---|---|---|---|
| 4,241,608 | 12/1980 | Dees et al. |  |
| 4,272,991 | 6/1981 | Cribbs | 128/660 X |
| 4,277,979 | 7/1981 | Vilkomerson et al. |  |
| 4,281,549 | 8/1981 | Kretz | 73/626 |
| 4,368,643 | 1/1983 | Tachita et al. | 128/660 X |
| 4,387,447 | 5/1983 | Kretz | 128/660 X |
| 4,391,281 | 7/1983 | Green | 128/660 |
| 4,398,422 | 8/1983 | Haerten |  |
| 4,399,704 | 8/1983 | Gardineer et al. |  |
| 4,409,982 | 10/1983 | Plesset et al. | 128/660 |
| 4,431,007 | 2/1984 | Amazeen | 128/660 |

FOREIGN PATENT DOCUMENTS

037012 7/1981 European Pat. Off.
2719130 1/1978 Fed. Rep. of Germany

Primary Examiner—Kyle L. Howell
Assistant Examiner—Francis J. Jaworski
Attorney, Agent, or Firm—Jon S. Saxe; Bernard S. Leon; George W. Johnston

[57] ABSTRACT

A real-time method and apparatus is disclosed for scanning large body areas to produce an ultrasound cross-sectional picture of the area in which at least two different and partially overlapping sector scans of the body are carried out in one scanning plane by the pulse-echo method utilizing an ultrasound transducer unit having a rigid transducer which is pivotable about an axis of oscillation perpendicular to the scanning plane, which performs an oscillatory movement about the axis of oscillation and between two end positions on each scan, and which is segmented into adjacent transducer elements. In performing the scans, at least two different transducer sets are used, each containing one or more transducer elements, each transducer set being used both for the emission of the ultrasound pulses and for the reception of echo waves. In all the scans the position of the axis of oscillation remains unchanged with respect to the body.

18 Claims, 7 Drawing Figures

Fig. 1